United States Patent [19]

Hooykaas

[11] Patent Number: 4,601,832

[45] Date of Patent: Jul. 22, 1986

[54] METHOD OF PROCESSING WASTE MATERIALS, PARTICULARLY SLUDGE CONTAINING NOXIOUS METALS

[75] Inventor: Carel W. J. Hooykaas, Rotterdam, Netherlands

[73] Assignee: Pelt & Hooykaas B.V., Netherlands

[21] Appl. No.: 690,747

[22] Filed: Jan. 11, 1985

[30] Foreign Application Priority Data

Jan. 12, 1984 [NL] Netherlands ............................ 8400107
Jun. 5, 1984 [NL] Netherlands ............................ 8401797

[51] Int. Cl.$^4$ ............................................ C02F 11/14
[52] U.S. Cl. ..................... 210/717; 106/85; 106/97; 106/103; 106/DIG. 1; 210/724; 210/726; 210/751; 210/912; 210/919; 405/129
[58] Field of Search ............... 106/97, 98, 103, 109, 106/DIG. 1, 85; 210/609, 710, 717, 724, 726, 738, 751, 912, 919, 770, 716; 405/129, 263; 501/155

[56] References Cited

U.S. PATENT DOCUMENTS

| | | | |
|---|---|---|---|
| 3,931,007 | 1/1976 | Sugano et al. | 210/721 |
| 4,110,212 | 8/1978 | Krofchak | 210/726 |
| 4,124,405 | 11/1978 | Quienot | 210/751 |
| 4,200,153 | 4/1980 | Gallus | 106/97 |
| 4,375,986 | 3/1983 | Pichat | 106/DIG. 1 |
| 4,398,956 | 8/1983 | Hooykaas | 106/DIG. 1 |
| 4,404,105 | 9/1983 | de Lockerente et al. | 210/912 |
| 4,432,666 | 2/1984 | Frey et al. | 405/129 |
| 4,465,518 | 8/1984 | Miyoshi et al. | 106/97 |

FOREIGN PATENT DOCUMENTS 8202225 1/1984 Netherlands ................. 106/DIG. 1

*Primary Examiner*—Peter Hruskoci
*Attorney, Agent, or Firm*—Ostrolenk, Faber, Gerb & Soffen

[57] ABSTRACT

A noxious metal(s) containing waste material is treated with an acid solution of a metal of group VIIa or VIII of the Periodical System, preferably iron or manganese. Subsequently, the metal of group VIIa or VIII dissolved in the acid is precipitated as a metal hydroxide and simultaneously the noxious metal(s) dissolved from said waste by said acid solution are incorporated in said precipitating metal hydroxide.

The waste material together with precipitated metal hydroxide is subjected to an immobilization treatment.

Manganese hydroxide is particularly suitable for removing cadmium.

An acid solution of iron and preferably simultaneously manganese to be used for treating the waste is obtained by dissolving oxysludge caught during iron or steel manufacture.

The method is particularly for treating dredged harbor sludge. The dredge sludge may be formed into granules after mixing with a preformed mixture of the amount of a binder and 50 to 90% of the total amount of fly ash and subsequently the granules are treated with the remaining amount of fly ash. Carbon black and/or a water repellent substance may be added to the remaining amount of fly ash.

9 Claims, No Drawings

METHOD OF PROCESSING WASTE MATERIALS, PARTICULARLY SLUDGE CONTAINING NOXIOUS METALS

BACKGROUND OF THE INVENTION

1. Field of the Invention

The invention relates to a method of processing waste materials containing noxious metals.

Waste materials of this type are for instance fly ash, gypsum, soil contaminated with heavy metals, sludge, dredged harbour sludge, sludge obtained from sewage treatment, jarosite obtained in the preparation of zinc, cadmium containing pigments in waste materials and similar materials.

2. Description of the Prior Art

Processing such noxious metal containing waste materials causes many problems as the noxious metals are easily leached from such waste materials during storage and this will involve contamination of the surrounding and contamination of the ground water respectively.

Thus, from an environmental point of view very severe requirements have to be met in order to be allowed to store and to process such waste materials.

A well known example of a waste material containing noxious anionic metals is dredged harbour sludge which has to be stored in particularly prescribed areas.

Another waste material to be processed involving much problems is fly ash emitted by coal driven electrical plants. This fly ash contains many noxious metals and though it has been tried to convert fly ash into particles from which noxious metals cannot be leached, the still increasing amounts of fly ash to be processed give rise to contamination of the environment due to leaching of noxious metals during storage in the open air.

SUMMARY OF THE INVENTION

The main object of the invention is to provide a process for processing such noxious metals containing waste materials, no noxious metals are leached from the waste materials finally to be stored, so that the formation of deposits on each location is possible and moreover the waste materials may be used for elevating the soil bottom, for filling cavities formed by sand sucking and similar applications.

This object is attained in that a composition of waste material and liquid is treated with a noxious metal(s) incorporating metal compound precipitating in said composition.

As the noxious metal(s) are incorporated in the metal compound the noxious metal or noxious metals cannot be extracted from the final processed waste.

Preferably the noxious metal(s) containing waste material is suspended in a metal ion containing solution, dissolving the noxious metal(s) from the waste material and metal ions are precipitated from the solution as a metal hydroxide.

By precipitating metal ions from the metal ions containing solution particularly in the form of a metal hydroxide noxious metals such as chromium, molybdenum, cadmium, zinc and similar materials are particularly incorporated into the precipitated metal hydroxide. This holds particularly when the metal hydroxide is iron (III) hydroxide.

From the metal ions containing solution advantageously a metal from group VIIA and/or VIII of the Periodical System is precipitated.

Preferably the metal ion containing solution contains manganese ions precipitating as manganese hydroxide. Manganese hydroxide is particularly suitable for removing cadmium besides many other noxious metals such as chromium, molybdenum and similar materials, as present in the solution.

Particularly the metal ion containing solution is obtained by treating iron containing dust obtained in the preparation of iron or steel with an acid dissolving said iron.

Such a dust of the iron or steel preparation contains substantial amounts of iron (dust from blast furnaces 36% of iron and dust from steel plants 60% of iron) so that by treating this dust with acid the iron dissolves easily and consecutively by making said solution alkaline the metal hydroxide will precipitate thereby incorporating noxious metal ions, particularly noxious heavy metals.

The abovementioned iron containing dust contains besides iron, zinc and cadmium and/or lead but these metals are simultaneously caught by the precipitated iron hydroxide.

The use of this dust presents the advantage that this iron containing dust forming an environmental nuisance may be efficiently used for processing waste materials containing noxious metals. In this respect it should be noted that though, the dust contains a substantial amount of iron, the simultaneous presence of zinc does not allow to re-use the dust for manufacturing iron.

More particularly the invention provides a process for removing noxious metals from waste materials by applying another difficult waste material by dissolving the iron as present in the waste material.

After precipitation of a metal, particularly iron and/or manganese hydroxide or another metal hydroxide, the remaining solids may be immobilised according to processes known per se such as drying, whether or not thereby forming granules or another method. From the immobilised mass no noxious metals such as cadmium, chromium, zinc and such materials may be extracted.

The process according to the invention is particularly suitable for pretreating the waste material subjected to immobilisation in order to avoid any later extraction of noxious metals from the immobilised mass.

In a preferred embodiment the waste material to be processed is dredged harbour sludge.

It is namely known that in sludge, particularly harbour sludge obtained by dredging, there may occur large quantities of noxious substances, in particular harmful heavy metals, such as cadmium, as a result of which depositing such dredge sludge upon soil surfaces is considered inadmissable.

There has been proposed already a method for converting such sludge into materials which are suitable for raising, filling up or being added to soil surfaces without harmful metals being easily capable of being leached out of the particles of the mass of particles.

Although when mixing sludge obtained by dredging with fly ash and a hydraulic binding agent there is indeed obtained a mass of particles useful for the above purposes, in certain cases the leaching of harmful metals may still be excessive, especially in the case of dredged sludge containing large concentrations of such harmful metals.

Therefore in another aspect the invention provides a method for forming a mass of particles which lends itself to raising and filling up or being added to soil surfaces, without there being the danger of metals contained in the sludge being leached out at a later stage, in which method the moisture-containing sludge (preferably pretreated with a prcipitating metal compound as described hereinbefore) is gradually added to a preformed mixture of the total amount of a binding agent to be used with 50 to 90% of the total amount of fly ash to be used, while mixing and forming a loose mass of particles having such a consistency that they do not desintegrate upon deformation and, on the other hand, no moisture from the interior of the particles is being formed on the outside of the particles, whereupon at least the remaining amount of fly ash is gradually added to the mass of particles.

The following measures are of great importance in this method:

a. First, there is formed a preformed mixture of hydraulic binding agent, in particular blast furnace slag cement or Portland cement, with at least 50% of the total amount of fly ash that is to be contained in the particle-formed mass to be ultimately obtained.

b. The sludge is being added to the preformed mixture very gradually, while ensuring the formation of particles which, when being subsequently deformed, for instance due to pressure as occurring in an accumulation of particles, do not desintegrate while, on the other hand, no moisture from the interior of the particles can be formed on the surface of the particles which could give rise to the particles clotting together and a mass of coherent particles being formed which cannot be used for further processing.

In order to fully prevent the slightly moist particles from clotting together, the particles can be mixed with the remaining amount of fly ash in a second step. The particles are then provided with an external layer of fly ash capable of binding moisture at a later stage.

Preferably, mixing proceeds in a fluidized bed.

Adding sludge takes place effectively in a manner so that at the most 20% of the total amount of sludge to be added to the preformed mixture is being added over a proportionate period of the total mixing time.

Effectively, at most 10% of the total quantity of sludge to be added is added, and preferably approximately 5 to 8%.

Advantageously, the mass of particles contains 3 to 5% hydraulic binding agent, particularly approximately 5% hydraulic binding agent, expressed in percentage by weight. In this manner, a very good mass of particles is obtained whose particles are sufficiently hard to afford using them as a mass of particles in the raising and filling up of soil surfaces or as road material. With particular advantage, after having been formed, the mass of particles is mixed with a water-repellent substance, such as a polymeric silicon compound, but other substances would qualify as well.

When mixing with a water-repellent substance, it is particularly worthwhile to mix such water-repellent substance with the amount of fly ash remaining to be added to the mass of particles as formed.

When processing moist harbour sludge it frequently occurs that this sludge is contaminated by floating oil forming small particles which render it practically impossible to obtain a loose mass of non-agglomerating particles.

In such cases it is advisable to add 1 to 8% preferably 5% carbon, preferably in the form of carbon black, to the remaining quantity of fly ash.

The oil particles are absorbed by the carbon black and do not lead to particles being formed which clot together easily.

PREFERRED EMBODIMENT

The invention will now be further explained with reference to some examples.

EXAMPLE I 100 kg of an oxysludge obtained by catching dust emitted during steel preparation and containing 60% of iron and 1,5% of zinc beside other metals is dissolved in 500 ml 1% hydrochloric acid. The hydrochloric acid dissolves iron as well as zinc.

Subsequently, 300 kg of fly ash, obtained from a coal driven electrical plant, is added to said 500 liter solution. This fly ash contains important quantities of cadmium.

After carefully mixing the mixture is made alkaline by adding ammonia until a pH is reached comprised between 6 and 9. Advantageously the pH is brought at about 7 by means of ammonia.

Due to the alkaline conditions the iron ions as present in the metal ion containing solution precipitate as iron (III) hydroxide.

In precipitating ironhydroxide simultaneously the cadmium as present is incorporated in the iron hydroxide precipitate.

Subsequently the solid substances consisting of said metalhydroxide containing noxious metal(s) together with the treated fly ash are separated from the liquid and dried. It appears no noxious metals, such as cadmium will be leached out from the mass during storage at the air, and this holds particularly when the final product has been dried at the air.

EXAMPLE II

Example I is repeated but to the solution there is also added 25 kg manganese chloride.

It appears that the precipitated manganese hydroxide has caught all cadmium ions as present and no cadmium can be leached out from the manganese precipitate after drying of the precipitate with the remaining portion of the treated fly ash.

EXAMPLE III

Example II is repeated but instead of fly ash 250 kg of dredged harbour sludge contaminated with heavy metals such as cadmium, chromium, molybdenum are added. In this way also an excellent removal of cadmium is obtained, as the cadmium is caught by the precipitated manganese hydroxide and iron hydroxide and after drying said cadmium cannot be leached out from the dried material of metal hydroxide and the remaining sludge portion.

EXAMPLE IV

Example II is repeated but instead of fly ash 250 kg soil contaminated with heavy metals are added.

In the soil contaminated with heavy metals a substantial amount of cadmium is present. This cadmium and other heavy metals are effectively removed by catching said cadmium in the precipitated iron hydroxide and manganese hydroxide.

After drying of the remaining soil mass and precipitated iron (III) hydroxide and manganese hydroxide no cadmium is leached out from said mass.

Optionally, the mass may be shaped into globules before drying.

An auxiliary agent being poor in noxious metals such as particular fly ash types or a puzzolanic substance may be added to the mass in order to facilitate the formation of globules.

EXAMPLE V

Example II is repeated by adding 250 kg of gypsum obtained by decomposing phosphate ore for forming phosphoric acid. After drying of remaining gypsum with the manganese hydroxide containing the absorbed noxious metals no noxious metals are leached out from the dried mass.

EXAMPLE VI

Example II is repeated but instead of fly ash 250 kg of sludge of a sewage purification plant is added.

After drying of the remaining sludge with the manganese hydroxide containing the absorbed cadmium, no cadmium will be leached out from the mass.

EXAMPLE VII

Examples I and II are repeated with cadmium containing jarosite a composition obtained during the preparation of zinc.

Cadmium is completely caught in the precipitated iron (III) hydroxide or manganese hydroxide. After drying of the jarosite remaining after the treatment, containing said metal hydroxide, no zinc is leached out from the dried mass.

EXAMPLE VIII

Examples I and II are repeated with cadmium containing pigments.

The cadmium is completely caught in the precipitated iron (III) hydroxide or manganese hydroxide.

After drying of the remaining mass with cadmium containing iron and/or manganese hydroxide and thereby forming granules, no cadmium is extracted from the dried mass.

EXAMPLE IX

An iron chloride solution is formed by treating oxysludge with a hydrochloric acid solution.

This hydrochloric acid solution is mixed with an aqueous suspension of harbour sludge contaminated by heavy metals, such as cadmium. Subsequently, a sodium hydroxide solution is added to pH 5 to 6.

The heavy metals are perfectly absorbed into the precipitating iron hydroxide and, after conversion into particles for instance according to example I, cadmium cannot be leached out from such particles.

EXAMPLE X

A mixture of 5 kilograms of Portland cement and 25 kilograms of fly ash is formed in a fluidized-bed mixer. Thereupon, 100 kg of dredged harbour sludge (preferably pretreated according to example III) having a moisture content of approximately 30 tot 50% is added to the preformed mixture as obtained. The addition is such that every 10 seconds no more than 3 kilograms of dredged sludge is added. In the present example, 2 kg of dredged harbour sludge was added in a period of 10 seconds.

A loose granular mass is obtained which is mixed gradually with another 5 kg of fly ash in a fluidized-bed mixer.

Excellent particles are obtained and after air-drying, it will not be possible to leach any harmful material from said particles.

EXAMPLE XI

A mixture of 5 kg of a hydraulic binder in the form of Portland cement and 15 kg of fly ash is formed in a fluidized-bed mixer. Gradually, dredged harbour sludge (preferably pretreated according to example III) containing 10% moisture is added to the mixture, the addition takes place is such a way that every 10 seconds 2 kg of dredged harbour sludge is added. After obtaining a particulate mass, it is mixed with 15 kg of fly ash in a fluidized-bed mixer. A proper particulate mass is obtained, but it is obviously possible that noxious material is leached out from the fly ash layer provided on the outerside of the particles.

EXAMPLE XII

Example X is repeated, but there is added to the remaining quantity of 5 kg of fly ash 1 kg of calcium stearate as a water-repellent agent.

Instead of the latter compound, it is also possible to add sodium silicate or a another water-repellent silicon compound.

Another suitable water-repellent agent is aluminium hydroxychloride.

EXAMPLE XIV

A mixture of 5 kg of hydraulic binder in the form of Portland cement and 15 kg of fly ash containing 5% carbon in the form of carbon black is formed in a fluidized-bed mixer. Oil-contaminated dredged harbour sludge is (preferably pretreated according to example III) is gradually added to the mixture, the addition being such that every 10 seconds 2 kg of dredged harbour sludge is added. After having obtained a particulate mass, it is ixed with 15 kg of the aforesaid fly ash in the fluidized-bed mixer. A proper particulate mass is obtained, but it is obviously possible that harmful material may be leached out from the fly-ash layer provided on the outer side of the particles.

Particles are obtained wherein the oil has been absorbed from the harbour sludge by the carbon black.

Without carbon black it is not possible to obtain non agregating particles, since the contaminated oil will adhere to the outerside of the particles.

What is claimed is:

1. A process for treating a waste material containing heavy metals including cadmium, using oxysludge including dust having iron and zinc therein, the oxysludge being obtained by collecting the dust from off gases from a blast furnace or steel plant for preparing iron or steel, said process comprising:
   (a) treating the oxysludge with a sufficient amount of an acid to produce a solution containing iron ions in the trivalent state;
   (b) forming a suspension of the waste material in the solution to thereby dissolve the heavy metals from the waste material to form heavy metal ions in the solution;
   (c) mixing a sufficient amount of an alkali with the suspension to precipitate the iron ions as ferric hydroxide, wherein the heavy metal ions are incorporated in the ferric hydroxide and immobilized therein; and (d) removing the water therefrom to produce a solid composition whereby the heavy metals are immobilized therein and cannot be leached therefrom.

2. The process of claim 1, wherein before forming a suspension, manganese ions are added to the solution.

3. The process of claim 1, wherein the waste material is a composition containing dredged harbor sludge.

4. The process of claim 3, wherein the composition containing the dredged harbor sludge is produced by a process comprising the steps of mixing the sludge, which contains free moisture with fly ash and a hydraulic binder, to thereby form a mass of particles, the fly ash and the binder being capable of binding at least the total quantity of free moisture in the sludge, wherein said mass is produced by gradually adding the sludge to a preformed mixture of the total amount of binder to be used with about 50% to 90% of the total amount of fly ash to be used, mixing and forming a loose mass of particles having a consistency that does not disintegrate upon deformation and has no moisture from the interior of the particles being formed on the outside of the particles, and then gradually adding the remaining amount of fly ash to the particles.

5. The process of claim 4, wherein up to 10% of the total amount of sludge to be added to the preformed mixture is added over a proportionate period of the total mixing time.

6. The process of claim 4, wherein from about 5 to about 8% of the total amount of sludge to be added to the preformed mixture is added over a proportionate period of the total mixing time.

7. The process of claim 4, wherein about 5% of binding agent is contained in the total mixture of binding agent and fly ash.

8. The process of claim 4, wherein about 1 to 8% by weight of carbon black is contained in the fly ash.

9. The process of claim 4, wherein a water repellant substance is added to the remaining amount of fly ash.

* * * * *